Oct. 28, 1969 D. J. TONEY 3,475,741

MAGNETIC DISK PACKS

Filed Aug. 31, 1967

Derek John Toney Inventor

By Cushman, Darby & Cushman Attorneys

United States Patent Office 3,475,741

Patented Oct. 28, 1969

3,475,741

MAGNETIC DISK PACKS

Derek J. Toney, Redhill, England, assignor to Zonal Film (Magnetic Coatings) Limited, Redhill, England, a British company Filed Aug. 31, 1967, Ser. No. 664,786
Claims priority, application Great Britain, Sept. 7, 1966, 39,941/66
Int. Cl. G11b *5/00;* G01d *15/12*
U.S. Cl. 340—174.1 16 Claims

ABSTRACT OF THE DISCLOSURE

This application describes a magnetic disk pack for use in a computer. This disc pack is dismantleable and consists of a number of nonmagnetic material disk support turntables to the top and bottom of which can be attached thin magnetic-material covered disks. In the assembled state the disks are held firmly on the support turntable by an applied suction.

This invention relates to magnetic disk packs for use in storing digital computer information.

Magnetic disk packs are known which consist of a number of circular metallic disks carrying on each face a magnetic coating. These disks are joined together axially to form a pack which then can be mounted in a computer. In the computer, the pack is rotated by a high speed drive and transducer heads transverse the radius of each magnetic surface to record information thereon or replay information already stored thereon. Usually a number of transducer heads are employed in series and these are supported on a cushion of air about a thousandth of an inch off the surface of the magnetic coating. The main advantage of a disk pack compared to magnetic tape for the storage of information is that information can be retrieved almost instantaneously as the annulus of the magnetic disk which contains the required information is known.

The main disadvantage of the hitherto known disk packs has been their size and their cost. Each metallic disk must be machined to a high degree of accuracy to prevent damage to any scanning transducer and machining of this type is expensive. Most of the hitherto known packs are not meant to be dismantled and thus present storage problems. Each indvidual disk is from about 12 to 24 inches in diameter and about 1 inch in width at its centre point and the disks therefore take up a considerable storage space.

It is the object of the present invention to provide component parts adapted to make a dismantleable magnetic disk pack and a disk pack made therefrom in which the above disadvantages are minimised.

According to a first feature of the present invention there is provided a magnetic disk support turntable made of a nonmagnetic material for use as part of a dismantleable magnetic disk pack, which comprises a hollow axial hub and extending outwards therefrom a hollow disk member having two flat outer faces parallel to each other and which has in each said face a plurality of apertures which communicate with the hollow space in the disk member, there being provided a plurality of apertures leading from the hollow space of the disk member into the central hollow of the hub. By the connection of the hubs to a suitable pump section pressure may be established at the said apertures.

It is preferred that the support turntable has on the flat outer faces of its disk member raised and/or recessed portions adapted to locate a thin removeable magnetic disk. Such a raised portion may be, for example, a central boss.

The support turntable according to the present invention may be made monolithically out of a nonmagnetic material such as aluminum or the central hub only may be of aluminum the hollow disk member being of a plastics material such as a copolymer of a acrylonitrile-butadiene-styrene.

According to a second feature of the present invention there is provided a magnetic disk adapted to be carried by the hereinbefore described support turntable which is a disk, having a cutout centre portion and which is either a film of thin base material which has coated thereon, on one side only, a magnetic coating or is a thin film of magnetic material.

By thin is meant from one to twenty thousandths of an inch depending on the rigidity and/or storage ability of the material used. The magnetic disk may have, for example, polyethylene terephthalate as the base material, there being coated on this an adherent layer of magnetic oxide particles in a polymeric binder such as polyurethane based polymer or there may be on the polyethylene terephthalate base an adherent thin film of a metal such as cobalt or nickel cobalt alloy. Alternatively the magnetic disk may be a thin film of cobalt or nickel cobalt alloy or may be a thin film of plastics material such as a polycarbonate which contains finely comminuted magnetic oxide particles dispersed therein.

It is preferred that the magnetic disk has a reinforced peripheral ring which extends outwards and fits into an annular groove on the support turntable. The magnetic disk can be accurately located on the turntable by arranging for the cutout centre position to mate with a raised central boss on the turntable. The magnetic disk may be radially located by providing a key on the central boss and a correspondingly key slot in the inner periphery of the magnetic disk. For initial loading of the magnetic disks onto the turntable there may be provided projections on the reinforcement rim of the disk which are adapted to fit into corresponding slots or apertures on the periphery of the disk member of the turntable.

According to a further aspect of the present invention there is provided a dismantleable magnetic disk pack which comprises, in the assembled state, a plurality of support turntables of the type herinbefore described each of which carry on both sides of their hollow disk members a magnetic disk of the type hereinbefore described, the said turntables being vacuum tightly mounted one on another on a central hollow spindle mounted on a bed plate which is juxtaposed to the first mounted turntable, the said hollow spindle having along its length a plurality of series of apertures which correspond in position to the hub apertures of each of the mounted turntables, the hollow spindle being provided with means to connect it to a vacuum pump, with means to enable it to be rotated, and with means to clamp or fasten the turntable most remote from the bed plate on to the spindle.

In operation, when the magnetic disk pack is mounted in a computer the spindle is connected to a vacuum pump. This causes the inside of the spindle and the hollow disk members to be under a vacuum which in its turn causes a suction to be exerted through the apertures in the disk members, which acts on the magnetic disks mounted on both sides of the flat disk members, holding them rigidly flat thereon.

The turntables can be located radially in respect to the hollow spindle by providing a key on the spindle and a corresponding key slot in the hub of each turntable.

In one embodiment of the invention vacuum sealing rings are provided between each turntable mounted on the hollow spindle.

The magnetic disk pack of the present invention may be removeable from the computer as an entity or it may be fixedly mounted therein the turntables with their adherent magnetic disks only being removeable. When the turntables have been removed from the computer the adherent magnetic disks may be taken off the disk members and stored after marking the location of the disk when it was in the magnetic disk pack. While each support turntable may cost more than a metallic magnetic disk only a comparative few are required to enable a computer to run continuously using fresh magnetic disks which can be placed on to the turntables and removed therefrom when information has been recorded thereon.

The following drawings will serve to illustrate one embodiment of a turntable and one embodiment of a magnetic disk and a magnetic disk pack made therefrom.

Figures 1, 2:
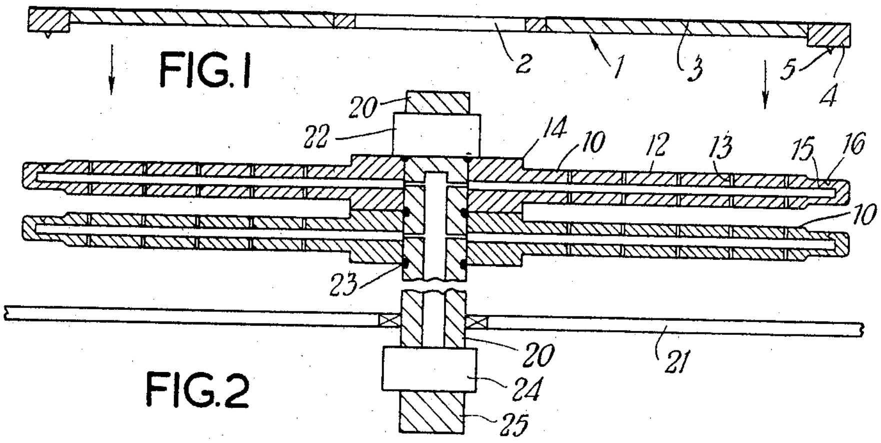
FIGURE 1 is a cross-sectional side elevation of a magnetic disk.
FIGURE 2 is a cross-sectional side elevation of a magnetic disk pack.

In FIGURE 1 the magnetic disk 1 consists of a circular support 2 of polyethylene terephthalate on which is coated a magnetic layer 3 which comprises magnetic oxide particles in a polyurethane based polymeric binder. The centre 3 of the disk has veen cut out. On the periphery of the disk there is a reinforcement rim 4 which carries projections 5 which are adapted to fit into holes on the turntable.

In FIGURE 2 the magnetic disk pack comprises a number of turntables 10. Each turntable 10 consists of a central hollow hub with a hollow disk member 12 extending radially therefrom. On both faces of the disk member 12 there are vacuum suction holes 13. In the middle of the turntable there is a raised boss 14. There are two peripheral grooves 15 around the disk and there are holes 16 around the disk for the projections 5. The turntable is made monolithically of aluminum.

The turntables 10 are mounted one on another on a spindle 20. The lowermost turntable rests on a bed plate 21. On both faces of each turntable there is an adherent magnetic disk 1 (not shown in position). The top pile of turntables is secured to the spindle 20 by a quick release clamp 22. Between each turntable 10 there is a vacuum sealing ring 23. A rotary vacuum coupling 24 connects the spindle 20 to a vacuum pump (not shown). The boss 25 is adapted to be connected to a rotary drive to enable the magnetic disk pack to be rotated at high speeds.

Figure 3:
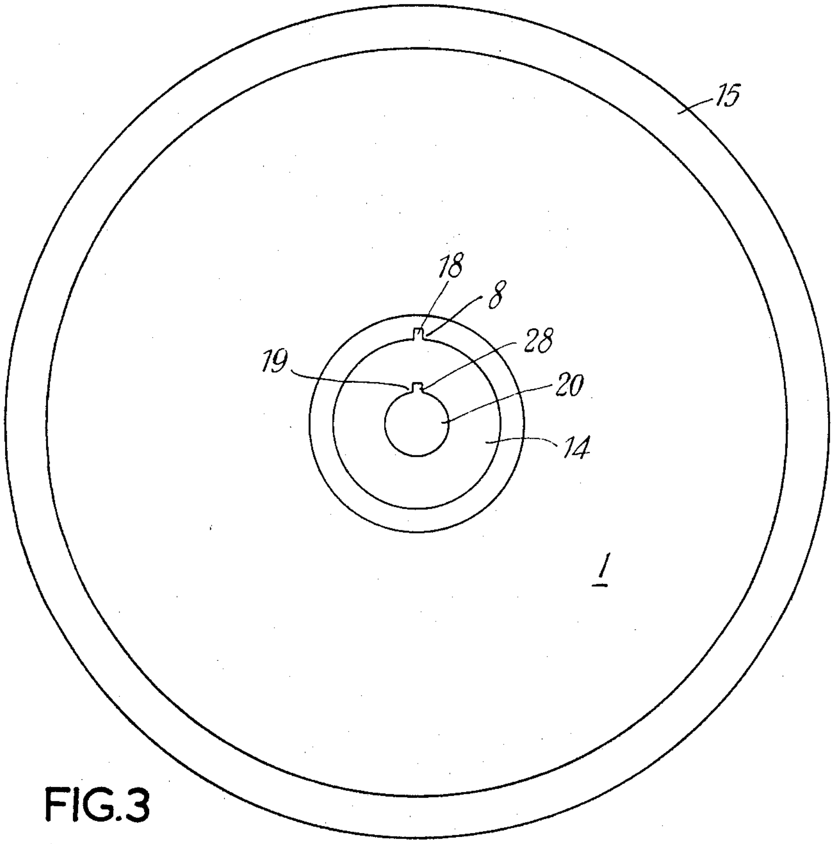
FIGURE 3 is a top plan view of a magnetic disk pack with the clamping member removed.

In FIGURE 3 a magnetic disk 1 is shown mounted over the boss 14 of a support turntable. The support turntable is mounted over the spindle 20. The magnetic disk is prevented from moving radially on the turntable by the provision of a key 18 on the boss 14 which mates with the key slot 8 in the magnetic disk. The support turntable is prevented from moving radially on the spindle by the provision of a key 28 on the spindle. This key mates with the key slot 19 on the inside of the hub of the turntable.

I claim as my invention:

1. A magnetic disk support turntable made of a non-magnetic material for use as part of a dismantleable magnetic disk pack provided with a vacuum source which comprises a hollow axial hub and extending outwards therefrom a hollow disk member having two flat outer faces parallel to each other and which has in each said face a plurality of apertures which communicate with the hollow space in the disk member, there being provided a plurality of apertures leading from the hollow space of the disk member into the central hollow of the hub, the said vacuum source communicating with the atmosphere when the turntable is in use solely through a path comprising the apertures in the hollow disk member and the hollow axial hub.

2. A magnetic disk support turntable according to claim 1 which has on the outer faces of its disk member raised and/or recessed portions adapted to locate a thin removeable magnetic disk.

3. A magnetic disk support turntable according to claim 2 wherein the raised portion is a central boss.

4. A magnetic disk support turntable according to claim 1 which is made of aluminium.

5. A magnetic disk support turntable according to claim 1 in which the hollow axial hub is made of aluminium and the hollow disk member is made of a plastics material.

6. A magnetic disk support turntable according to claim 1 which has an annular groove on each outer face of the disk member.

7. A magnetic disk adapted to be carried by the magnetic disk support turntable as claimed in claim 1 which is a disk, having a cutout centre portion and which is either a film of thin base material which has coated thereon, on one side only, a magnetic coating, or is a thin film of magnetic material.

8. A magnetic disk according to claim 7 wherein the thin base material of the disk is composed of polyethylene terephthalate.

9. A magnetic disk according to claim 8 wherein the magnetic coating on the polyethylene terephthalate base is a layer of a polymeric binder containing dispersed therein magnetic oxide particles.

10. A magnetic disk according to claim 9 wherein the polymeric binder is a polyurethane based polymer.

11. A magnetic disk according to claim 8 wherein the magnetic coating on the polyethylene terephthalate base is an adherent thin film of a magnetic metal.

12. A magnetic disk according to claim 11 wherein the thin film of magnetic metal is cobalt or nickel/cobalt alloy.

13. A magnetic disk according to claim 7 wherein the thin film of magnetic material is a film of plastics material which contains finely comminuted magnetic oxide particles dispersed therein.

14. A magnetic disk according to claim 13 wherein the film of plastics material is composed of polycarbonate.

15. A dismantleable magnetic disk pack provided with a vacuum source which comprises, in the assembled state, a plurality of support turntables as claimed in claim 1, each of which carry on both sides of their hollow disk members a magnetic disk having a cutout centre portion and which is either a film of thin base material which has coated thereon, on one side only, a magnetic coating or is a thin film of magnetic material, the said turntables being vacuum tightly mounted one on another on a central hollow spindle mounted on a bed plate which is juxtaposed to the first mounted turntable, the said hollow spindle having along its length a plurality of series of apertures which correspond in position to the hub apertures of each of the mounted turntables, the hollow spindle being provided with means to connect it to said vacuum source, with means to enable it to be rotated, and with means to clamp or fasten the turntable most remote from the bed plate on to the spindle, she said vacuum source communicating with the atmosphere when the disk pack is in use solely through a path comprising the apertures in the hollow disk member, the hollow axial hub and the central hollow spindle.

16. A dismantleable magnetic disk pack according to claim 15 wherein vacuum sealing rings are provided between each turntable mounted on the hollow spindle.

References Cited

UNITED STATES PATENTS

| | | | |
|---|---|---|---|
| 3,229,269 | 1/1966 | Katz | 340—174.1 |
| 3,369,227 | 2/1968 | Boissevain | 340—174.1 |
| 3,187,317 | 6/1965 | Smith | 340—174.1 |

TERRELL W. FEARS, Primary Examiner

JOEL ROSENBLATT, Assistant Examiner

U.S. Cl. X.R.

346—74